Patented Sept. 27, 1932

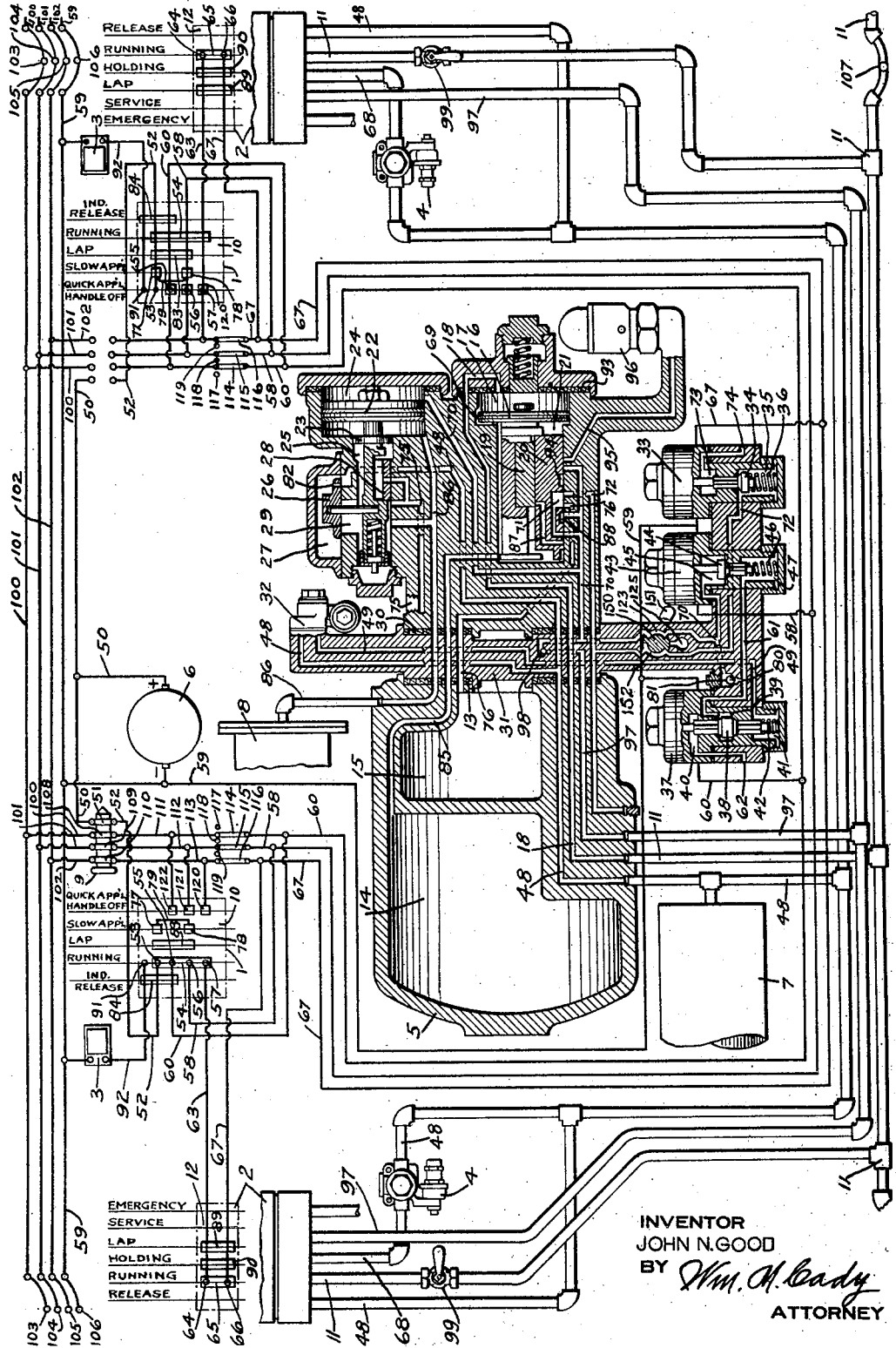

1,879,678

UNITED STATES PATENT OFFICE

JOHN N. GOOD, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed October 12, 1929. Serial No. 399,129.

The invention relates to electro-pneumatic brakes and more particularly to a double ended electro-pneumatic brake equipment for locomotives.

In the usual double ended pneumatic locomotive brake equipment, the various valve devices are connected by pipes, some of which extend from one end of the locomotive to the opposite end of the locomotive. If these pipes break or are subject to severe leakage the control of the locomotive brakes may be lost. Furthermore, the rate of brake control pneumatically depends upon the length of piping employed in connecting the various devices and if such piping is long, the operation of the valve devices is slowed down to an undesirable degree. This is especially true in double heading when the brakes on a second locomotive are controlled by the operation of the brakes on the leading or control locomotive.

One object of my invention is to provide an electrically controlled pneumatic brake equipment for locomotives in which the number of pipes employed is reduced to a minimum, and the operation of the various pneumatically operated valve devices are controlled electrically.

Another object of my invention is to provide an improved locomotive brake equipment in which the rate of brake control is constant irrespective of locomotive length.

Another object of my invention is to provide an improved locomotive brake equipment with which the brakes on a second locomotive, similarly equipped, are operated simultaneously with the brakes on the leading locomotive and at the same rate as if only one locomotive were being operated.

Other objects and advantages will appear in the following more detailed description of my invention.

In the accompanying drawing the single figure is a diagrammatic view, partly in section, of an electro-pneumatic locomotive brake equipment embodying my invention.

As shown in the drawing, the brake equipment is of the double ended type, so that it may be operated from either end of the locomotive and comprises at each end an independent brake switch device 1, a combined automatic brake valve and switch device 2, an electrically operated signal device 3, a switch plug 9 and a feed valve device 4. The equipment also comprises a distributing valve device 5, a source of electrical energy, preferably in the form of a generator 6, a main reservoir 7 and a brake cylinder 8.

The independent brake switch device 1 is shown in a diagrammatic development form and may comprise a movable drum 10 carrying a plurality of insulated contacts, which are adapted to engage stationary fingers, to which various control wires are connected, as will be hereinafter explained.

The combined brake valve and switch device 2 may comprise a brake valve of the usual well known type, which is adapted to control the pressure of fluid in a brake pipe 11. A switch portion is mounted on said brake valve device and comprises a movable drum 12 adapted to be operated as the brake valve is operated. The drum 12 is provided with a plurality of insulated contacts adapted to engage stationary fingers connected to brake control wires for controlling electric circuits in various positions of the device, as wll be more fully explained hereinafter.

The distributing valve device 5 comprises a reservoir portion, a valve portion and a magnet portion, the reservoir portion comprising a casing having a gasket face 13, a pressure chamber 14 and an application chamber 15.

The valve portion of the distributing valve device comprises an equalizing portion and an application portion. The equalizing portion comprises a piston 16 contained in a chamber 17, which communicates with brake pipe 11 through a passage 18, and slide valves 19 and 20 contained in a chamber 21 and adapted to be operated by said piston. The application portion comprises two connected pistons 22 and 23 contained in chambers 24 and 25, respectively, an application valve 26 contained in a chamber 27 and an exhaust valve 28 contained in a chamber 29, the valves 26 and 28 being adapted to be operated by said pistons.

The magnet portion of the distributing valve device is built in the form of a filler section 31, which is inserted between gasket face 13 on the reservoir portion and a gasket face 30 on the valve portion. Carried by the filler section 31 is a release magnet valve device, a slow application magnet valve device, a quick application magnet valve device and a reducing valve device 32.

The release magnet valve device comprises a magnet 33 and a valve 34 contained in a chamber 35 and adapted to be unseated by energization of said magnet. A spring 36 also contained in chamber 35 engages the valve 34 for seating said valve when the magnet 33 is deenergized.

The slow application magnet valve device comprises a magnet 37 and a double beat valve 38 contained in a chamber 39. The valve 38 has a fluted stem extending upwardly into a chamber 40 and another fluted stem extending downwardly into a chamber 41, wherein a spring 42 engages said stem and urges the valve 38 upwardly.

The quick application magnet valve device comprises a magnet 43, a valve 44 contained in a chamber 45 and a spring 46 contained in a chamber 47 and engaging the fluted stem of said valve. The energization of magnet 43 is adapted to seat valve 44, whereas when said magnet is deenergized, the spring 46 is adapted to unseat said valve.

The reducing valve device 32 is of the well known structure and is adapted to reduce the pressure of fluid supplied from main reservoir 7 through pipe and passage 48, to that employed in operating the locomotive brakes, and then supply fluid at such reduced pressure to passage 49.

In operation, assume the left end of the locomotive to be the operative end or the end from which the locomotive brakes will be controlled. The switch plug 9, which is provided with a plurality of insulated bars is inserted at the operative end, so that said bars engage the terminals of opposite wires for closing control circuits through said wires as will be fully evident from the following description.

At the inoperative end of the locomotive, the independent brake switch device is placed in quick application position and the combined brake valve and switch device is placed in running position, the only positions in which their operating handles (not shown) can be removed. Only one handle is provided for each of said devices per locomotive and are carried on the independent brake switch device and combined brake valve and switch device at the operative end, and normally both of said devices are turned to running position as shown in the drawing, in which position, the brake system is charged with fluid under pressure and the brakes are released, as will be hereinafter explained.

To more clearly show that the independent brake switch device 1 and combined automatic brake valve and brake switch device 2 are in their normal or running position, it will be noted that in each device the control wires are extended to fixed contacts, which register with movable contacts on the drums 10 and 12 in their running position. In the following description it will be understood that the movable contacts will be shifted into engagement with said fixed contacts in accordance with the operation desired, as effected in the various positions of said devices.

The generator 6 is operated in any suitable manner and produces electric current which may flow from the positive pole through wire 50 to contact bar 51 on switch plug 9 and from thence through wire 52 to fixed contact 53 on the independent brake switch device 2. The fixed contact 53 engages movable contact 54 on the drum 10 and fixed contacts 55, 56 and 57 also engage movable contact 54, so that electric current is permitted to flow from fixed contact 53 to fixed contacts 55, 56, and 57.

Electric current supplied to contact 56 flows therefrom through wire 58 to quick application magnet 43 and from thence through return wire 59 to the negative pole of generator 6, thus completing a circuit through said magnet. The magnet 43 is thereby energized and operates to seat valve 44.

Electric current supplied to fixed contact 55 of the independent brake switch device flows therefrom through wire 60, and slow application magnet 37 to the return wire 59, thereby closing an electric circuit through said magnet. The magnet 37 is thereby energized and operates to seat double beat valve 38 in its lower position, in which spring chamber 47 of the quick application magnet valve device is connected to the atmosphere through passage 61, valve chamber 39 in the slow application magnet valve device, past valve 38 to chamber 40 and from thence through atmospheric passage 62.

Electric current supplied to contact 57 flows therefrom through wire 63 to fixed contact 64 on the combined brake valve and switch device and from thence through movable contact 65, fixed contact 66 and wire 67 to release magnet 33, which is also connected to return wire 59. The release magnet is thereby energized which operates to unseat valve 34.

Fluid under pressure is supplied to main reservoir 7 in the usual manner and flows therefrom through passage 48 to the reducing valve devices 32 and application valve chamber 27 and through pipe 48 to the feed valve device 4 and brake valve portion of the combined brake valve and switch device 2. The feed valve device 4 is adapted to reduce the pressure of fluid from that in the main reservoir to that carried in the brake pipe 11 and supply fluid at such a reduced pressure through pipe 68 to the brake valve device 2, which in running position permits the fluid at reduced pressure to flow to brake pipe 11, charging said brake pipe.

Fluid under pressure supplied to brake pipe 11 flows through passage 18 to equalizing piston chamber 17, wherein it acts on the equalizing piston 16. The equalizing piston is thereby operated to shift the slide valves 19 and 20 to their normal release position, as shown in the drawing. In release position of piston 16, fluid under pressure is permitted to flow from piston chamber 17 through a feed groove 69 to valve chamber 21 and from thence through passage 85 to pressure chamber 14, so as to charge said chambers with fluid at brake pipe pressure.

With the equalizing slide valve 20 in release position the application cylinder 24 is connected to the atmosphere through passage 70, cavity 71 in said slide valve, passage 72, release magnet valve chamber 35, past valve 34, which is unseated by the energization of magnet 33 as hereinbefore described, through chamber 73 and atmospheric passage 74.

With the application cylinder thus normally at atmospheric pressure, the application piston 22 and slide valves 26 and 28 assume the position shown in the drawing, as will be explained hereinafter. With the exhaust slide valve 28 in the position shown in the drawing, the brake cylinder 8 is connected to the atmosphere through pipe and passage 86, exhaust valve chamber 29 and an atmospheric passage 75.

The application chamber 15 of the distributing valve device is normally connected to the atmosphere through passage 76, cavity 71 in the equalizing slide valve 20, passage 72 and past the unseated release magnet valve 34.

If it is desired to effect a slow application of the locomotive brakes, the drum 10 of the independent brake switch device 1 is turned or shifted to slow application position, in which position the fixed contact 53 engages movable contact 77 on drum 10 and fixed contact 56 engages movable contact 78. Contacts 77 and 78 are joined by a connector 79, thereby permitting electric current to flow from the current supply wire 52, through contacts 53, 77, 78 and 56 and wire 58 to quick application magnet 43 and from thence through return wire 59 to generator 6. The quick application magnet 43 is thereby energized in the same manner as in running position and thus operates to maintain the valve 44 seated.

In slow application position of the independent brake switch, no electric current is supplied to fixed contacts 55 and 57 and as a result the release magnet 33 and slow application magnet 37 are both deenergized.

Deenergization of the release magnet 33 permits spring 36 to seat valve 34 and close the atmospheric connection from the application cylinder 24 through passage 70, cavity 71 in equalizing slide valve 20 and passage 72.

Deenergization of the slow application magnet 37 permits spring 42 to shift double beat valve 38 to its upper position, so as to close the atmospheric connection from passage 61 through chamber 40 and passage 62, and connect chamber 41 to chamber 39. Fluid under pressure supplied by the reducing valve 32 through passage 49 to chamber 41 is thus permitted to flow through chamber 39 to passage 61 and from thence through a restricted passage 80 and past a ball check valve 81 to passage 70 leading to the application chamber 24, thereby building up a pressure in said chamber.

The pressure of fluid supplied to the application chamber 24 acts to shift the application piston 22 to the left. The initial movement of piston 22 to the left causes the exhaust slide valve 28 to lap the atmospheric passage 75 and further movement causes the application slide valve 26 to be shifted to a position in which fluid at main reservoir pressure is permitted to flow from valve chamber 27 through a port 82 in said slide valve to valve chamber 29 and from thence through passage and pipe 86 to brake cylinder 8, so as to apply the locomotive brakes.

When the desired degree of brake cylinder pressure is obtained, the independent brake switch drum 10 is turned to lap position, in which electric current from supply wire 52 is permitted to flow through fixed contact 53 to movable contact 83 and from thence through fixed contacts 55 and 56 to the release magnet 33 and slow application magnet 37.

In lap position of the independent brake switch, the release magnet is thus maintained deenergized, the quick application magnet 43 remains energized and the slow application magnet 37 is energized.

Energization of slow application magnet 37 seats double beat valve 38 in its lower position, thereby preventing further flow of fluid under pressure to the application cylinder 24. The ball check valve 81 prevents back flow of fluid under pressure from passage 70 from the application cylinder 24 to the atmosphere through passage 61, chamber 39, past double beat valve 38, through chamber 40 and atmospheric passage 62. Thus the fluid under pressure in the application cylinder 24 is bottled up and remains constant.

When the pressure of fluid supplied to the brake cylinder 8 and effective in the valve chamber 29 and in the chamber intermediate the application piston 22 and piston 23, becomes slightly greater than the pressure in the application cylinder 24, then said pistons are shifted to the right, causing the application slide valve 26 to be moved and prevent further flow of fluid under pressure from the valve chamber 27 to the valve chamber 29 and brake cylinder 8. Thus the pressure in the brake cylinder is built up to a degree substantially equal to or slightly greater than the pressure of fluid supplied to the application cylinder 24.

By moving the independent brake switch again to slow application position, the pressure of fluid in the application cylinder may be increased and cause a corresponding increase in brake cylinder pressure, as will be obvious from the foregoing description.

If it is desired to effect a quick application of the locomotive brakes, the drum 10 of the independent brake switch device is turned to quick application position, in which position the fixed contact 53 on the supply wire 52 does not register with any movable contact on the drum 10. As a result, no electric current is supplied to the magnets 33, 37 and 43. The release magnet 33 and slow application magnet 37 thus are deenergized and fluid under pressure is supplied to the application cylinder 24 through the choked passage 80 in the same manner as when a slow application of the brakes is effected as hereinbefore described. In addition however, the quick application magnet 43 is deenergized and spring 46 unseats valve 44 which permits an unrestricted flow of fluid under pressure from passage 61 past valve 44 to passage 70 and from thence to the application cylinder 24. The fluid under pressure is thus supplied to the application cylinder through the choked passage 80 and past the quick application magnet valve 44, and effects a build up of pressure in said chamber at a greater rate than is obtained in slow application position of the independent brake switch.

To release the locomotive brakes, drum 10 of the independent brake switch device may be turned to the independent release position, in which electric current from supply wire 52 is permitted to flow through fixed contact 53 to a movable contact 84 on the drum 10 and from thence to fixed contact 55 and by way of wire 60 to magnet 37 which is connected to return wire 59. The slow application magnet 37 is thus energized, which seats double beat valve 38 in its lower position and cuts off the supply of fluid under pressure from the reducing valve 32 to valve chamber 39 and from thence to passage 61. No electric current is supplied to the quick application magnet 43 and release magnet 33, so that both these magnets are deenergized. Deenergization of quick application magnet 43 permits spring 46 to unseat valve 44, so as to permit fluid under pressure to flow from the application cylinder 24 to the atmosphere through passage 70, past valve 44, through passage 61, past the upper seat of double beat valve 38, through chamber 40 and through atmospheric passage 62. Deenergization of release magnet 33 permits spring 36 to seat valve 34, so as to close communication from chamber 35 to chamber 73 which is connected to the atmosphere through passage 74.

With the combined brake valve and brake switch device in the running position as shown in the drawing, the locomotive brakes may be released by turning drum 10 of the independent brake switch device to running position, in which electric current is supplied to the three magnets 37, 43 and 33, the supply to the release magnet 33 passing from the independent brake switch device, through the combined brake valve and switch device to said magnet.

The energization of magnet 37 cuts off the supply of fluid under pressure to passage 61 as when releasing in the independent release position. Energization of magnet 43 seats valve 44, while energization of magnet 33 unseats valve 34. The unseating of valve 34 effects a communication from the application cylinder 24 to the atmosphere by way of cavity 71 in the equalizing slide valve 20 as described in initially charging the equipment. Through this communication the fluid under pressure is vented from the application cylinder 24 to the atmosphere.

When the fluid under pressure is vented from the application cylinder 24, the fluid at brake cylinder pressure acting on the opposite side of the application piston 22, shifts said piston and slide valves 26 and 28 to the position shown in the drawing, in which position fluid under pressure is permitted to flow from brake cylinder 8 to the atmosphere through pipe and passage 86, application valve chamber 29 and atmospheric passage 75.

From the above description it will be noted that there are two positions of the independent brake switch in which the locomotive brakes may be released, the reason for which will be clearly set forth in the operation to be hereinafter described.

The locomotive brakes may be controlled in the usual manner by varying the pressure of fluid in the brake pipe 11 by operation of the combined brake valve and switch device 2.

To apply the locomotive brakes, the combined brake valve and switch device 2 is turned to service position in which the pressure of fluid in brake pipe 11 is reduced in the usual well known manner. Reducing the brake pipe pressure causes a corresponding reduction in the equalizing piston chamber 17, which permits the pressure of fluid in the equalizing valve chamber 21 to shift the equalizing piston 16 and slide valves 19 and 20 to service position, in which fluid under pressure is permitted to flow from the pressure chamber 14 and valve chamber 21, which are connected through passage 85, to the application cylinder 24 by way of port 87 in slide valve 20, which port is uncovered by slide valve 19, and passage 70, which registers with port 87. Passage 70 is connected through a cavity 88 to passage 76, so that at the same time fluid under pressure also flows to the application chamber 15. The pressure of fluid thus supplied to the application cylinder 24 causes an application of the locomotive brakes to be effected in the same manner as hereinbefore described.

If it is desired to limit the degree of pressure with which the brakes are applied, the brake pipe pressure may be reduced a predetermined amount and then the combined brake valve and switch device 2 may be turned to lap position, in which further reduction in brake pipe pressure is prevented. In such a case, when the pressure in equalizing valve chamber 21 becomes reduced to a degree slightly less than the reduced brake pipe pressure in piston chamber 17, then the piston 16 and slide valve 19 are shifted to the left relative to slide valve 20, in which position slide valve 19 laps port 87 and prevents further flow of fluid under pressure to the application cylinder 24. Then when the brake cylinder pressure is built up to a degree slightly exceeding the pressure in the application cylinder 24, the application piston 22 operates slide valve 26 to prevent further flow of fluid under pressure to the brake cylinder, as hereinbefore described.

In order to release the brakes, the combined brake valve and switch device may be turned to running position, in which the brake pipe 11 is recharged with fluid under pressure in the well known manner, causing the equalizing piston 16 to shift the slide valves 19 and 20 to their release position, in which the pressure chamber 14 is recharged with fluid under pressure and the application cylinder 24 is connected to the release magnet valve chamber 35. With the combined brake valve and switch device 2 in running position and the independent brake switch device 1 in its running position, electric current is permitted to flow through the release magnet 33 and thus effect a release of fluid under pressure from the application cylinder 24 and cause a release of the locomotive brakes, as hereinbefore described.

It will be noted that the independent brake switch device 1 must be in running position to permit a release of the brakes by operation of the combined brake valve and switch device, since in no other position of the independent brake switch is electric current supplied to the wire 63. This is desirable under various conditions such as in case it is desired to hold the locomotive brakes applied with the independent brake switch in lap position, while the combined brake valve and switch device is turned to running position to recharge the brake pipe 11.

Under certain conditions it may be desirable to effect a release of the locomotive brakes in the lap or other positions of the combined brake valve and switch device 2 and in order to accomplish this, insulated, fixed contacts such as 89 and 90 may be employed to connect the wires 63 and 67 in the various positions, as shown in the drawing.

If, while the locomotive brakes are applied by a reduction in brake pipe pressure as hereinbefore described, it is desired to release the locomotive brakes without recharging the brake pipe 11 as hereinbefore described, then drum 10 of the independent brake switch device 1 may be turned to the independent release position, in which electric current is supplied to magnet 37. The magnet 37 is thereby energized, seating double beat valve 38 in its lower position and magnet 43 being deenergized, permits fluid under pressure to be vented from the application cylinder 24 to cause a release of the locomotive brakes in the same manner as hereinbefore described.

In the independent release position of the independent brake switch 1, electric current also flows from the supply wire 52 through fixed contact 53 and movable contact 84 to a fixed contact 91 and from thence through a wire 92 and through signal device 3 to return wire 59, thus closing an electric circuit through said signal device, causing same to operate and warn the operator of the position that the brake switch is in. This is desirable in that the locomotive brakes can not be controlled by operation of the combined brake valve and switch device 2 except when the independent brake switch device is in running position, and this warning tends to cause the operator to place the independent brake switch in the running position before attempting the control of locomotive brakes by the combined brake valve and switch device 2.

To effect an emergency application of the brakes, the combined brake valve and switch device 2 may be turned to emergency position, in which the fluid under pressure is suddenly vented from the brake pipe 11 and equalizing piston chamber 17. This sudden reduction in pressure in piston chamber 17 permits the pressure of fluid in equalizing valve chamber 21 to shift the equalizing piston 16 and slide valves 19 and 20 to emergency position, in which said piston engages a gasket 93. In emergency position, slide valve 20 uncovers passage 70, thereby permitting fluid under pressure to flow from valve chamber 21 and the connected pressure chamber 14 through said passage to the application cylinder 24 and thereby apply the locomotive brakes. Passage 70 is also connected through a cavity 94 to a passage 95, so that fluid at the pressure supplied to the application cylinder also flows through passage 95 to a safety valve device 96. The safety valve device 96 may be of the usual well known construction and is adapted to limit the pressure obtained in the application cylinder 24 by venting any excess to the atmosphere.

To compensate for leakage which may be effective to reduce the pressure in the application cylinder, fluid under pressure is also supplied to said cylinder from the combined brake valve and switch device 2 through a maintaining pipe and passage 97 and past a ball check valve 98 to passage 70 from the application cylinder, the rate of supply being less than the capacity of the safety valve device 96, so as not to exceed the pressure limit of said safety valve device.

To release the locomotive brakes after an emergency application, the combined brake valve and switch device 2 may be turned to running position to recharge the brake pipe 11 and cause the distributing valve device to operate and release the brakes in the manner hereinbefore described.

If there is no electric current, as in case the generator 6 fails, the locomotive brakes may still be operated pneumatically.

A cut-out valve device comprising a rotatable plug valve 150 and a handle 151 for operating said plug valve is provided in the filler section 31. The plug valve 120 is normally carried in the position shown in the drawing, in which position a cavity 152 establishes communication through passage 72 and another cavity 123 establishes communication through passage 70 to permit the operation hereinbefore described.

If there is no electric current for controlling the magnets 37, 43 and 33, then said magnets are all deenergized. Magnet valve 44 and magnet double beat valve 38 are thus both in the upper quick application position in which fluid under pressure is supplied through passage 70 to the application cylinder 24 as hereinbefore described. However, the plug valve 120 may be turned counter-clockwise to another position in which the passage 70 is lapped by said plug valve, which prevents the flow of fluid under pressure to the application cylinder. Also in this second position of the plug valve 120, the cavity 122 connects passage 72 to an atmospheric passage 125, so as to connect the application cylinder 24 to the atmosphere, when the equalizing slide valve 20 is in release position, by way of passage 70, cavity 71 in said slide valve, passage 72, cavity 122 in plug valve 120 and atmospheric passage 125. Now the distributing valve device may be operated to control the locomotive brakes by varying the brake pipe pressure, in the same manner as hereinbefore described, when electric current was available and the independent brake switch device 1 was in running position.

In the brake pipe 11 below each combined brake valve and switch device 2 is placed a valve device 99 for controlling communication from the brake pipe to said combined brake valve and switch device. At the operative end of the locomotive this valve device is open, so as to permit control of the fluid under pressure in said brake pipe in the manner hereinbefore described, however, at the inoperative end of the locomotive this valve device is carried in the closed position because the "handle off" position of the combined brake valve and switch device is in running position, in which fluid under pressure is permitted to flow from the feed valve device 4 to the brake pipe 11. Closing of the valve 99 prevents such flow to the brake pipe, which otherwise would interfere with the brake control from the operative end of the locomotive.

If it is desired to operate the brakes from the opposite end of the locomotive, the operating handles of the combined brake valve and switch device 2 and independent brake switch device 1 at the operative end of the locomotive are removed in the running and quick application positions, respectively, the switch plug 9 is removed and the valve device 99 is turned to closed position. The movement of the independent brake switch to quick application position, for removal of the operating handle, causes a quick application of the locomotive brakes, as hereinbefore described.

The operating handles are then placed on the combined brake valve and switch device and independent brake switch device at the opposite end of the locomotive and are then both turned to the running position. The valve device 99 at the opposite end of the locomotive is turned to open position, so as to permit control of the brake pipe pressure by the combined brake valve and switch device and the switch plug 9 is placed in position. The right end of the locomotive thus becomes the operative end and the left end, which was formally the operative end, becomes the inoperative end.

The magnet control wires 60 and 58 connect to the independent brake valve device at the right end of the locomotive, and the release magnet 33 is connected to the independent brake switch 1 through the combined brake valve and switch device 2. Also the insertion of switch plug 9 closes the electric circuit from the generator 6 to the independent brake switch device, so that when the independent brake switch device at the right or operative end of the car is turned to running position, the locomotive brakes are released and will thereafter operate in accordance with the operation of said independent brake switch device 1 and combined brake valve and switch device 2 in the same manner as when operated by the corresponding devices at the left end or formally operative end of the locomotive.

This brake equipment is so designed that two locomotives equipped with said equipment may be connected together and the brakes on the second locomotive may be controlled from the leading locomotive and thus caused to operate simultaneously with the brakes on the leading locomotive.

As shown in the drawing, there are three train wires 100, 101 and 102 and a return wire 59 running from one end of the locomotive to the opposite end of the locomotive and these wires are connected through connectors 103, 104, 105 and 106, respectively, to corresponding wires, which may run through a second or trailer locomotive. Likewise, the brake pipe 11 extends from one end of the locomotive to the opposite end of the locomotive and is connected through a coupling 107 to a brake pipe 11 on a trailer locomotive.

As hereinbefore described, the brake equipments on both a leading locomotive and a trailer locomotive will be identical to that shown in the drawing and on each locomotive the train wires 100, 101 and 102 are connected with insulated contact bars 108, 109 and 110 on the switch plug 9 to wires 111, 112 and 113, respectively. A manually operated switch device having contact bars 114, 115 and 116 is interposed between the wires 111, 112 and 113 and magnet wires 60, 58 and 67, respectively and is normally carried in the closed position, as shown in the drawing, so as to connect release magnet wire 67 through contact bar 116 to wire 113, quick application magnet wire 58 through contact bar 115 to wire 112 and slow application magnet wire 60 through contact bar 116 to wire 113. As a result, electric current is permitted to flow by way of wires 111, 112 and 113 to train wires 100, 101 and 102, respectively, in accordance with the operation of the magnets 33, 43 and 37, as determined by the position of the independent brake switch 1 and combined brake valve and switch device 2. Conversely, electric current supplied to train wires 100, 101 and 102 is permitted to flow to magnets 33, 43 and 37 on a trailer locomotive and since corresponding magnets on both the leading and trailer locomotives will be connected in parallel through said train wires, the brake equipments on both locomotives will be caused to function simultaneously upon operation of the brake switch device on one locomotive when the brake switch device on the other locomotive is in "handle off" position.

If for any reason the manually operated switch device is in the open position, so that the contact bars 114, 115 and 116 engage isolated contacts 117, 118 and 119 respectively, the operation of the brakes on the trailer locomotive from the leading locomotive will not be interfered with if the independent brake switch device 1 is in the quick application or "handle off" position, since a by-pass around said manually operated switch is provided. Under such conditions, the release magnet wire 63 from the combined brake valve and switch device 1 is connected through fixed contact 57 to movable contact 120 connected to wire 113. Likewise, magnet wires 58 and 60 are connected through fixed contacts 55 and 56 to movable contacts 121 and 122 on wires 112 and 111 respectively. Thus, the brakes on the trailer locomotive will still operate in accordance with the electric current supplied to train wires 100, 101 and 102, the circuits to the magnets 33, 37 and 43 being through the independent brake switch device, however, instead of through the manually operated switch device.

Under certain conditions, the operator on a trailer locomotive may desire to control the brakes on that locomotive independently of the brakes on the leading locomotive. In order to do so, the manually operated switch contact bars 114, 115 and 116 are moved to open position, if said switch is closed. The independent brake switch device is then moved to release, lap, running on slow application position in which the brakes on the trailer locomotive are operated in the same manner as hereinbefore described, said operation being independent of the operation on the leading locomotive and independent of the electric circuits in the train wires 100, 101 and 102. However, if the operator on the trailer locomotive moves the independent brake switch device to quick application or "handle off" position, then the brakes on said locomotive will again be controlled by the electric circuits in the train wires.

As hereinbefore mentioned, the brake pipes 11 on two coupled locomotives may be connected through a coupling 107. It is therefore obvious that the locomotive brakes on both locomotives will operate substantially simultaneously upon varying the pressure of fluid in said brake pipe by the operation of the combined brake valve and switch device on the leading locomotive.

While one illustrative embodiment of the invention has been described in detail, it is not my intention to limit its scope to that embodiment or otherwise than by the terms of the appended claims.

Having now described the invention, what is claimed as new and desired to be secured by Letters Patent, is:

1. In an electro-pneumatic brake, the combination with an electro-responsive device operative upon deenergization to effect an application of the brakes, of another electro-responsive device operative upon deenergization to aid in effecting an application of the brakes and operative upon energization of the first mentioned electro-responsive device to effect a release of the brakes, and an independent brake switch device for controlling said electro-responsive devices.

2. In an electro-pneumatic locomotive brake, the combination with pneumatic means for applying the locomotive brakes, of electro-responsive means for applying the locomotive brakes and cooperative with said pneumatic means for releasing the locomotive brakes, and a valve device for normally connecting said pneumatic means and electro-responsive means and adapted in one position to render said electro-responsive means inoperative to control the locomotive brakes and said pneumatic means operative to control the release of the locomotive brakes.

3. In an electro-pneumatic locomotive brake, the combination with pneumatic means for applying the locomotive brakes, of electro-responsive means for applying the locomotive brakes and cooperative with said pneumatic means for releasing the locomotive brakes, and a valve device for rendering said electro-responsive means inoperative to control the locomotive brakes and said pneumatic means operative to control the release of the locomotive brakes.

4. In a fluid pressure brake, the combination with a brake pipe, of a valve device operative upon a reduction in brake pipe pressure to apply the brakes, a brake valve device for reducing the brake pipe pressure and having a connection through which fluid under pressure is supplied to said valve device for maintaining the brakes applied, and means for preventing back flow through said connection.

5. In a fluid pressure brake, the combination with a brake pipe, of a valve device operative upon a reduction in brake pipe pressure to apply the brakes, a brake valve device for reducing the brake pipe pressure and having a connection through which fluid under pressure is supplied to said valve device for maintaining the brakes applied, and a check valve for preventing flow of fluid under pressure from said valve device to said connection.

6. In a fluid pressure brake, the combination with a brake pipe, of a valve device operative upon a reduction in brake pipe pressure to apply the brakes, a brake valve device for reducing the brake pipe pressure and having a connection through which fluid under pressure is supplied to said valve device for maintaining the brakes applied, and a check valve in said valve device for preventing back flow through said connection.

7. In a double end fluid pressure brake equipment, the combination with a brake pipe and a valve device operative upon a reduction in brake pipe pressure to apply the brakes, a brake valve device at each end of the equipment each having a service and an emergency position for reducing brake pipe pressure, a pipe connecting said brake valve devices to said valve device through which fluid under pressure is supplied in emergency position of either one of said brake valve devices to said valve device for maintaining the brakes applied and a check valve for preventing flow from said valve device to said pipe when a brake valve device is in service position.

8. In a double end brake equipment, the combination with electro-responsive means for controlling the brakes, a source of electric current, a brake switch device at either end of said brake equipment, for controlling circuits from said source of electric current to said electro-responsive devices, and a plug switch adapted to be removed at the non-control end of the equipment for disconnecting said source of electric current from the brake switch device at said non-control end of the equipment to render said brake switch device non-controllable, said plug switch being insertable at the control end of the equipment for connecting said source of electric current to the brake switch at the control end of the equipment to permit the last mentioned brake switch to control the brakes.

9. In an electro-pneumatic brake, the combination with electro-responsive devices for controlling the brakes, and a brake switch device for normally controlling the operation of said electro-responsive devices, said brake switch device having a double-heading position in which the circuits through said electro-responsive devices are opened, of train wires connected to said electro-responsive devices through said brake switch device when the brake switch device is in double heading position, said electro-responsive devices being operative by electric circuits in said train wires when the brake switch device is in double heading position.

10. In an electro-pneumatic brake, the combination with electro-responsive devices for controlling the brakes, and a brake switch device for normally controlling the operation of said electro-responsive devices, of train wires, a switch for connecting said train wires to said brake switch device and another switch for connecting said train wires from said brake switch device to said electro-responsive devices, said brake switch device being operative to control the circuits through said train wires at the same time as through said electro-responsive devices.

11. In an electro-pneumatic brake, the combination with electro-responsive devices for controlling the brakes, of train wires connected to said electro-responsive devices and a brake switch device for controlling electric circuits through said electro-responsive devices and through said train wires, and a switch device for disconnecting said train wires from said electro-responsive devices for rendering said brake switch device inoperative to control electric circuits in said train wires.

12. In an electro-pneumatic brake, the combination with a plurality of train wires, of electro-responsive devices operative in accordance with electric circuits in said train wires to control the brakes, a brake switch device for controlling the operation of said electro-responsive devices and a switch device having an open position for rendering said electro-responsive devices non-controllable by the electric circuits in said train wires.

13. In an electro-pneumatic brake, the combination with electro-responsive devices for controlling the brakes, of a source of electric current, a switch device having a position for connecting said source of electric current in circuit with said electro-responsive devices, train wires adapted to be supplied with electric current from another source of electric current, said switch device having a double-heading position in which said train wires are connected in circuit with said electro-responsive devices for controlling the operation of said electro-responsive devices in accordance with the electric current supplied over said train wires.

14. In an electro-pneumatic brake, the combination with a plurality of train wires, of electro-responsive devices operative in accordance with electric circuits in said train wires to control the brakes, a brake switch device for controlling the operation of said electro-responsive devices and a switch device having an open position for rendering said electro-responsive devices non-controllable by the electric circuits in said train wires, another switch device for connecting said train wires to said electro-responsive devices and operative in one position to permit the first mentioned switch device to control the electric circuits through said electro-responsive devices.

In testimony whereof I have hereunto set my hand, this 11th day of October, 1929.

JOHN N. GOOD.